US012682114B2

(12) United States Patent
Elias et al.

(10) Patent No.: US 12,682,114 B2
(45) Date of Patent: Jul. 14, 2026

(54) ANONYMIZING DATA IN DATABASE ON A SERVER

(71) Applicant: TOYOTA JIDOSHA KABUSHIKI KAISHA, Aichi-ken (JP)

(72) Inventors: Pablo Elias, Miura (JP); Thang Minh Vu, Fuchu (JP); Ellie Choi, Shinagawa-ku (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 104 days.

(21) Appl. No.: 18/613,790

(22) Filed: Mar. 22, 2024

(65) Prior Publication Data

US 2025/0298922 A1     Sep. 25, 2025

(51) Int. Cl.
*G06F 21/62* (2013.01)

(52) U.S. Cl.
CPC ................................. *G06F 21/6254* (2013.01)

(58) Field of Classification Search
CPC .................................................... G06F 21/6254
See application file for complete search history.

(56) References Cited

U.S. PATENT DOCUMENTS

| | | | | | |
|---|---|---|---|---|---|
| 11,537,924 | B2 * | 12/2022 | Balu | ....................... | G06N 20/00 |
| 11,557,136 | B1 * | 1/2023 | Zimmermann | .... | G06V 30/1916 |
| 11,562,168 | B2 * | 1/2023 | Balu | ..................... | G06V 10/764 |
| 11,662,215 | B2 * | 5/2023 | Bennati | ............... | H04L 63/0421 |
| | | | | | 701/411 |

| | | | | | |
|---|---|---|---|---|---|
| 11,700,240 | B2 * | 7/2023 | Max | ..................... | G06F 21/6254 |
| | | | | | 713/168 |
| 11,751,007 | B2 * | 9/2023 | Vidyakina | ............. | H04W 4/021 |
| | | | | | 455/456.1 |
| 11,754,405 | B2 * | 9/2023 | Bennati | .............. | G01C 21/3407 |
| | | | | | 701/466 |
| 2020/0019585 | A1 * | 1/2020 | Balu | ...................... | G06F 16/287 |
| 2020/0387632 | A1 * | 12/2020 | McErlean | ............... | G01S 19/42 |
| 2021/0264383 | A1 * | 8/2021 | Kleinhans | .............. | G06Q 10/20 |
| 2021/0409379 | A1 | 12/2021 | Hwang et al. | | |
| 2022/0027509 | A1 | 1/2022 | Amico | | |
| 2022/0050925 | A1 * | 2/2022 | Gyllenram | ............ | H04W 12/02 |
| 2022/0321343 | A1 | 10/2022 | Bahrami et al. | | |
| 2023/0128788 | A1 * | 4/2023 | Millington | ......... | G01C 21/3605 |
| | | | | | 701/533 |
| 2023/0145574 | A1 * | 5/2023 | Park | ...................... | G07C 5/085 |
| | | | | | 701/32.2 |
| 2023/0229807 | A1 * | 7/2023 | Friesen | ............... | G06F 21/6254 |
| | | | | | 726/6 |

(Continued)

FOREIGN PATENT DOCUMENTS

| | | |
|---|---|---|
| JP | 2016-177452 A | 10/2016 |
| JP | 2021-165879 A | 10/2021 |
| JP | 2022-159038 A | 10/2022 |

*Primary Examiner* — Stephen T Gundry
(74) *Attorney, Agent, or Firm* — HAUPTMAN HAM, LLP

(57) ABSTRACT

A method, device, and non-transitory computer-readable media for anonymizing data in a database on a server. Data obtained from a vehicle is stored in a database of a server. A vehicle identification number is removed from the data in the database. At least one specific parameter included in the data in the database is changed to create anonymized data. Access to the anonymized data is provide to the user. One or more files for a simulation are created using the anonymized data.

20 Claims, 5 Drawing Sheets

100

110

120

130

Data from Real World Test Vehicles → Files (e.g., Simulation Files) → Simulation Platform

(56)      References Cited

U.S. PATENT DOCUMENTS

| | | | |
|---|---|---|---|
| 2023/0244815 A1* | 8/2023 | Herman | G06V 40/168 |
| | | | 726/26 |
| 2023/0269102 A1* | 8/2023 | Ryu | B60R 21/013 |
| | | | 713/156 |
| 2023/0282036 A1* | 9/2023 | Simoudis | G06N 3/08 |
| 2023/0311936 A1* | 10/2023 | Park | G07C 5/008 |
| | | | 701/23 |
| 2023/0418977 A1* | 12/2023 | Bennati | H04W 12/02 |
| 2024/0143838 A1* | 5/2024 | Ardhanari | G16H 30/40 |
| 2024/0175703 A1* | 5/2024 | Vidyakina | G01C 21/3896 |
| 2024/0175704 A1* | 5/2024 | Vidyakina | G08G 1/0112 |
| 2024/0256709 A1* | 8/2024 | St. Gray | G06F 21/6254 |
| 2024/0323035 A1* | 9/2024 | Ryu | G06F 16/29 |
| 2025/0061804 A1* | 2/2025 | Skwarcan | G08G 1/04 |
| 2025/0121818 A1* | 4/2025 | Gutierrez | G06N 5/01 |
| 2025/0162441 A1* | 5/2025 | Wirola | B60L 53/62 |
| 2025/0298922 A1* | 9/2025 | Elias | G06F 21/6254 |

* cited by examiner

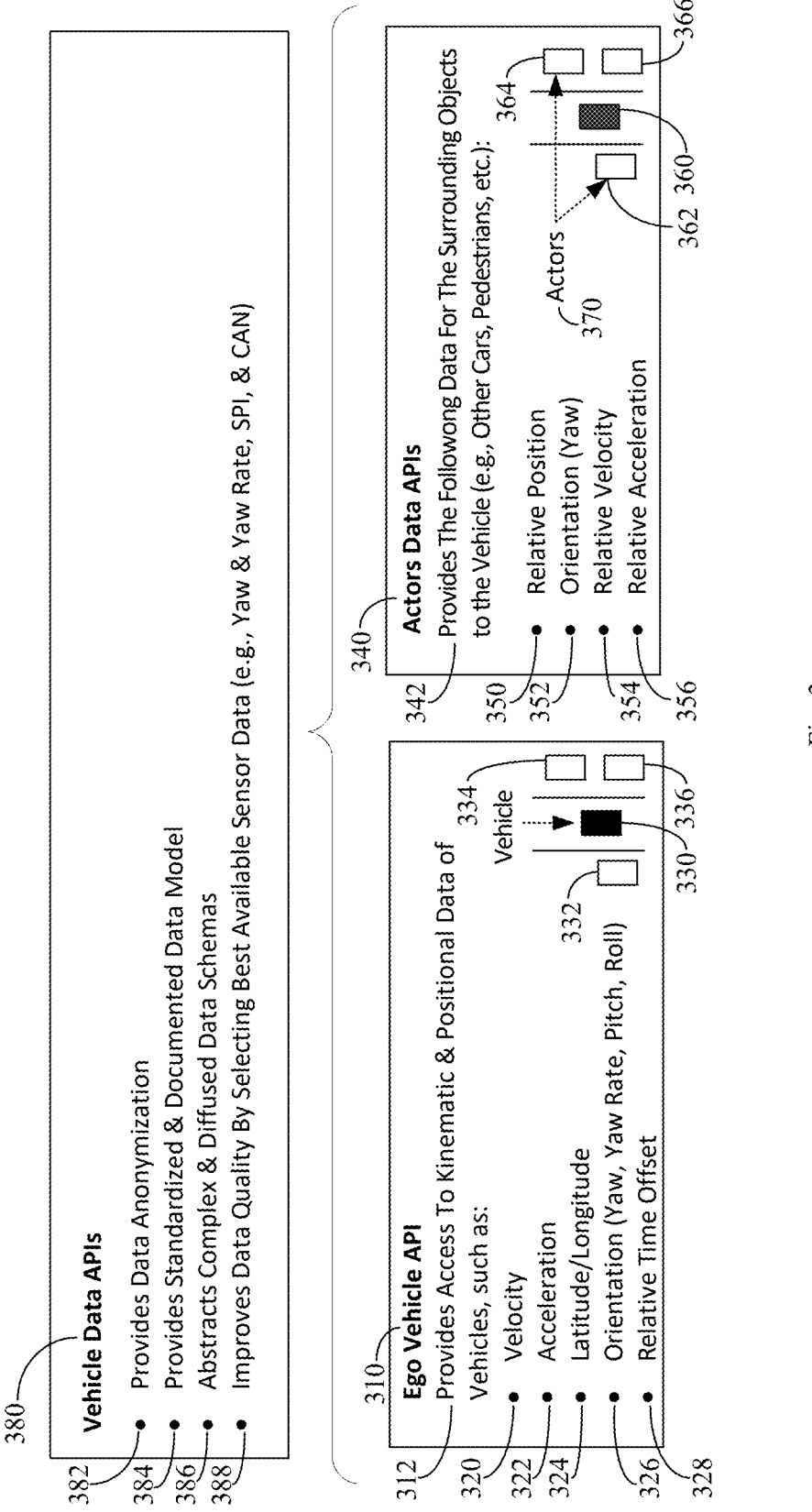

Vehicle Data APIs 380

382

- Provides Data Anonymization 384
- Provides Standardized & Documented Data Model 386
- Abstracts Complex & Diffused Data Schemas 388
- Improves Data Quality By Selecting Best Available Sensor Data (e.g., Yaw & Yaw Rate, SPI, & CAN)

Ego Vehicle API 310

312

Provides Access To Kinematic & Positional Data of 334
Vehicles, such as: 330

- Velocity 320
- Acceleration 322
- Latitude/Longitude 324
- Orientation (Yaw, Yaw Rate, Pitch, Roll) 326
- Relative Time Offset 328

332  336  Vehicle

Actors Data APIs 340

342

Provides The Followong Data For The Surrounding Objects
to the Vehicle (e.g., Other Cars, Pedestrians, etc.):

- Relative Position 350
- Orientation (Yaw) 352
- Relative Velocity 354
- Relative Acceleration 356

360  362  364  366  370  Actors

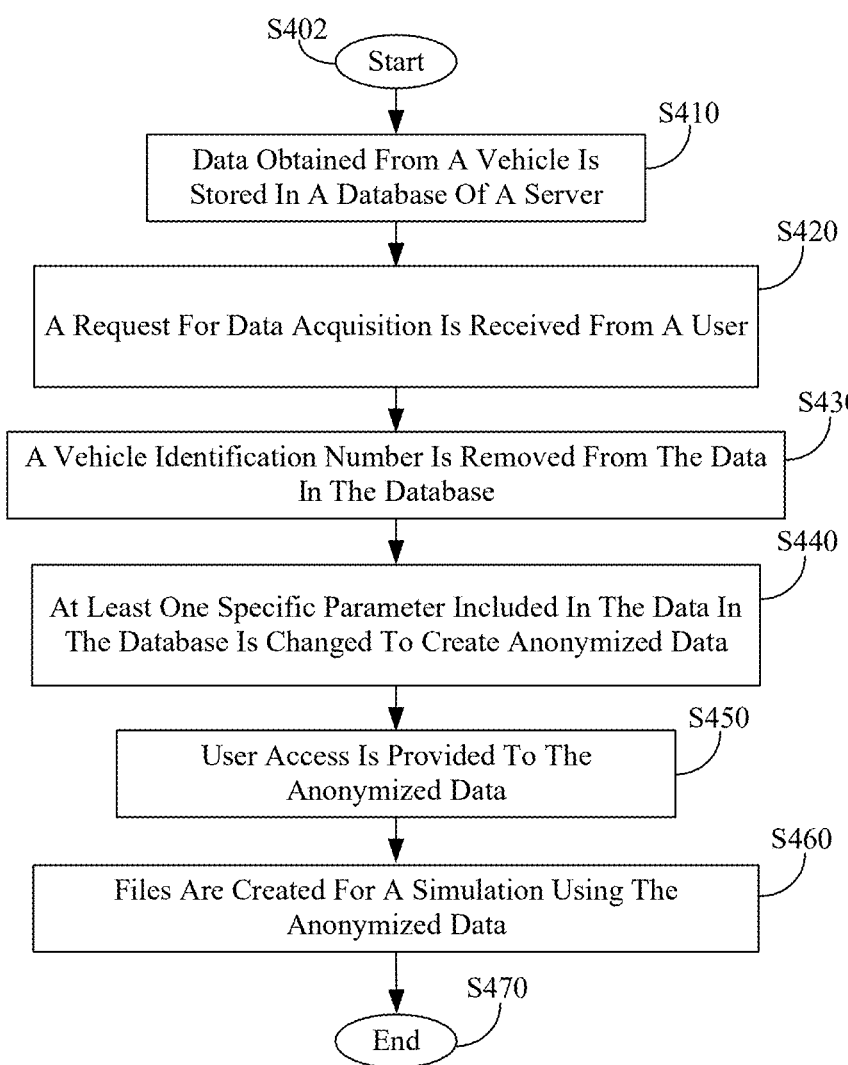

S402

Start

S410

Data Obtained From A Vehicle Is Stored In A Database Of A Server

S420

A Request For Data Acquisition Is Received From A User

S430

A Vehicle Identification Number Is Removed From The Data In The Database

S440

At Least One Specific Parameter Included In The Data In The Database Is Changed To Create Anonymized Data

S450

User Access Is Provided To The Anonymized Data

S460

Files Are Created For A Simulation Using The Anonymized Data

S470

End

Fig. 4

ANONYMIZING DATA IN DATABASE ON A SERVER

BACKGROUND

The demand of the market for intelligent driving function is increasing, and the safety is an important influencing factor to win the trust of the customers for intelligent driving. Safety tests include site tests, open road performance verification, and virtual verification at the initial stage of development. The degree of simulation of the virtual scene determines the comprehensiveness of Advanced Driver Assistance Systems (ADAS) and safety performance verification of the autonomous driving system. The current development processes of the ADAS system and the automatic driving system need to pass through MIL (model in loop), SIL (software in loop), HIL (hardware in loop), DIL (driver in loop) and VIL (whole vehicle in loop). The driving scene library is an important part in the development process and runs through the development process. Thus, the establishment of a comprehensive scene close to a real traffic environment is important.

Autonomous vehicle (AV) systems are complex and need a robust testing and validation framework to support engineers. Well-defined processes and infrastructure are available for software development to avoid bugs in code and maintain quality over time, especially for a large developer base. Automated regression catching through continuous integration is a component that ensures overall reliability by regularly testing the relevant features of the software. The dynamic content of scenarios for the use in virtual test drive simulations are able to be described using OpenScenario files. OpenScenario provides the data model, the specification and examples for the description of dynamic content in driving simulation. OpenScenario is used in driving simulation, traffic simulation, virtual development, test and validation of driving assistance functions, automated and autonomous driving. OpenScenario files describe entities acting on or interacting with the road. The dynamic content of scenarios includes information such as the maneuvers of traffic entities, e.g., vehicles, pedestrians, Infrastructure, Edge Devices, and bicycles.

Scenario files in OpenScenario format have a variety of usages, such as used in Continuous Integration (CI) testing and simulation on local/cloud environments. Continuous Integration allows iteration to support systemic builds and publishing of deployment artifacts into artifact repositories. For example, a Market Data Collection (MDC) server stores data acquired by sensors of vehicles while driving. To create OpenScenario files for a simulation the data has to be accessed. However, the data in a database on the MDC server includes sensitive L4 (highly confidential) data, i.e., PII (Personally Identifiable Information), such as timestamp information. PII is any information about an individual including any information that can be used to distinguish or trace an individual's identity, and any other information that is linked or linkable to an individual. Therefore, L4 data in the MDC database is only accessible by users that have special authorization, and OpenScenario files are not able to be created based on the data that includes PII.

SUMMARY

In at least embodiment, a method for anonymizing data in a database on a server includes storing data obtained from a vehicle in a database, removing a vehicle identification number from the data in the database, and changing at least one specific parameter included in the data in the database to create anonymized data.

In at least one embodiment, a device for anonymizing data includes a memory storing computer-readable instructions, and a processor connected to the memory, wherein the processor is configured to execute the computer-readable instructions to remove a vehicle identification number from data in a database stored in the server, and change at least one specific parameter included in the data in the database to create anonymized data.

In at least one embodiment, a non-transitory computer-readable media having computer-readable instructions stored thereon, which when executed by a processor causes the processor to perform operations to store data obtained from a vehicle in a database, remove a vehicle identification number from the data in the database, and change at least one specific parameter included in the data in the database to create anonymized data.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

FIG. 3 is a diagram of operation of the Vehicle Data API according to at least one embodiment.

FIG. 4 is a flow chart of a method for anonymizing data to create simulation files according to at least one embodiment.

DETAILED DESCRIPTION

Figure 1:
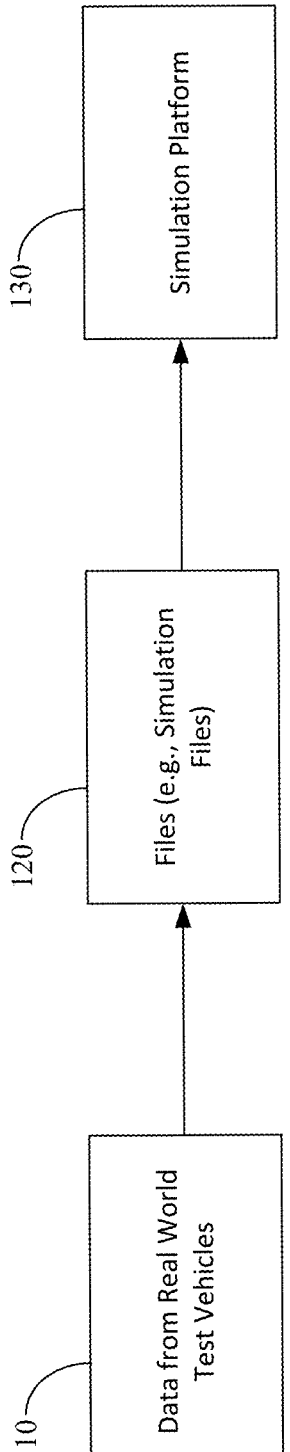
FIG. 1 is a flow diagram of a process for generation and use of simulation files according to at least one embodiment.

Embodiments described herein describe examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus is otherwise oriented (rotated 90 degrees or at other orientations) and the spatially relative descriptors used herein likewise are interpreted accordingly.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, data-streaming or signaling-streaming. The foregoing terms are utilized interchangeably in the subject specification and related drawings. The terms "access point," "base station," "Node B," "evolved Node B (eNode B)," next generation Node B (gNB), enhanced gNB (en-gNB), home Node B (HNB)," "home access point (HAP)," or the like refer to a wireless network component or apparatus that serves and receives data, control, voice, video, sound, gaming, data-streaming or signaling-streaming from UE.

In at least one embodiment, a method for anonymizing data in a database on a server includes storing data obtained from a vehicle in a database of a server, removing a vehicle identification number from the data in the database, and changing at least one specific parameter included in the data in the database to create anonymized data.

Embodiments described herein provide method that provides one or more advantages. For example, a Vehicle Data Application Programming Interface (API) anonymizes data stored in database on a Server by converting highly confidential data to anonymized protected data by changing at least one specific parameter included in the data in the database.

FIG. 1 is a flow diagram of a process for generation and use of simulation files 100 according to at least one embodiment.

In FIG. 1, reports/data from testing vehicles are obtained 110. Files, such as simulation files, are generated based on the reports obtained from test vehicles 120. Based on the files, test engineers and application developers are able to test applications in closed Software-In-The-Loop (SIL) tests without access to a real vehicle using a Simulation Platform 130. The Simulation Platform 130 is used to simulate sensors and ground-truth data for the tested vehicle and its surrounding virtual environment.

The reports/data from testing vehicles are stored as data in a database on a server, such as a Market Data Collection (MDC) server. The data is able to be raw data or pre-processed data. The data is acquired by sensors of vehicles while driving. However, the data in a database on the server includes sensitive (highly confidential) data, i.e., PII (Personally Identifiable Information), such as timestamp information. PII is any information about an individual including any information that can be used to distinguish or trace an individual's identity, and any other information that is linked or linkable to an individual. Therefore, sensitive data in the database is only accessible by users that have special authorization, and files for simulations, such as OpenScenario files, are not able to be created based on the data that includes PII. In order to create simulation files, at least one embodiment removes a vehicle identification number from the data in the database and changes at least one specific parameter included in the data in the database to create anonymized data. A request for data acquisition is received from a Vehicle Data Application Programming Interface (API).

Figure 2:
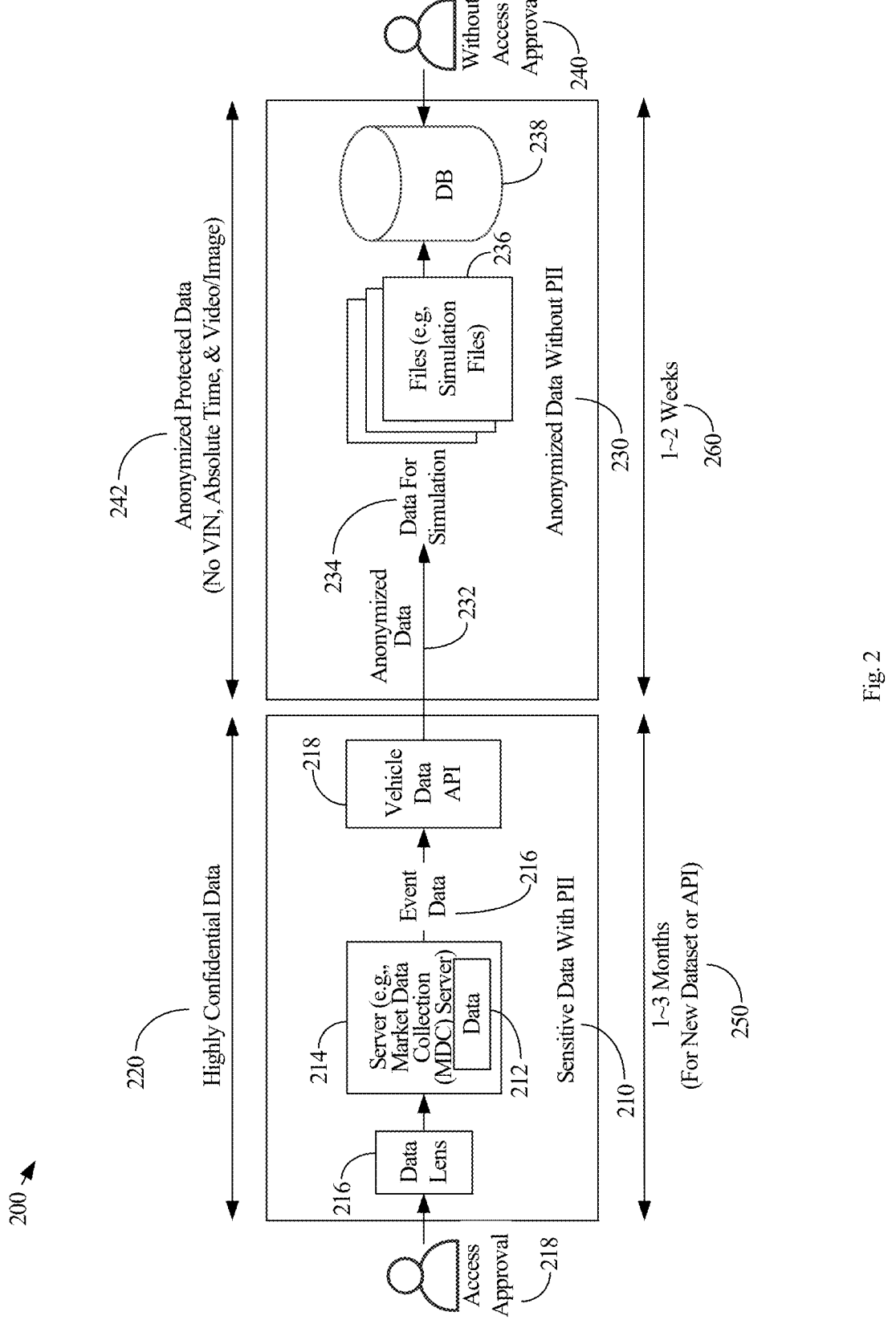
FIG. 2 is a schematic diagram of data anonymization according to at least one embodiment.

FIG. 2 is a schematic diagram of data anonymization 200 according to at least one embodiment.

In FIG. 2, Sensitive Data with Personally Identifiable Information 210 is obtained from a vehicle and is stored as Data 212 in the Server 214, e.g., hash data. The Data 212 is able to be raw data or pre-processed data. The Data 212 in Server 214 is data acquired by sensors of vehicles while driving and has not gone through the Data Lens 216 for processing before being provided to the Server 214. Data Lens 216 enables Users With Access Rights 218 to search, explore and interact with the Data 212 in the Server 214. An Ego Vehicle API has access to the Data 212. In the context of autonomous driving technology, an "Ego Vehicle" is a term used to describe the self-driving car that is equipped with sensors, cameras, and other technologies that enable it to perceive the environment and make decisions. Thus, the term "Ego" in this context refers to the fact that the vehicle is self-centered or self-referential, meaning that it perceives the world primarily from its own perspective. The vehicle's sensors and cameras are focused on detecting objects and obstacles in its immediate surroundings, which are used to provide safe navigation. Users With Access Rights 218 have a threshold of approval that is determined by the sensitivity of the data. For example, some users have access to data in the Server 214 via the Ego Vehicle API. Prior to anonymization, the Data 212 on the Server 214 includes combination of the GPS position or coordinate data, the timestamp, and the vehicle identification (ID), which enables a specific user to be identified. To be able to use the Anonymized Data 232, Data without Personally Identifiable Information (PII) is provided to the Users Without Access Approval 240. Thus, Users Without Access Approval 240 are able to submit a request for a subset of the Data 212 in the database in the Server 214. Vehicle Data API 218 processes Event Data 217 to anonymize the Data in the Server 214 to create Anonymized Data 232. The Data 212 is able to be raw data or data that is processed before being anonymized. The Anonymized Data is Anonymized Protected Data 242, which does not include Vehicle Identification Numbers (VIN), Absolute Time, and Video/Images.

Without Vehicle Data API 218 to anonymize the Data 212, i.e., Highly Confidential Data 220, the Data 212 on Server 214 still has timestamps in absolute time and the user thus cannot use the data to create files without having high level access approval.

Removing the user vehicle ID form the Data 212 makes identification of a user difficult, but identification of the user is still possible based on the location and the timestamp in the Data 212. For example, GPS position along with the timestamp could be used to identify a user that passed through a specific region and user information is able to be compromised.

Thus, in order to create files, at least one embodiment provides a Vehicle Data API 218 that obtains Data 212 and converts the Data 212 in the Server 214 to Anonymized Data 232 by changing at least one specific parameter included in the subset of the Data 212 in the Server 214. A request for data acquisition to the data in the Server 214 is received from the Vehicle Data API 218. The Vehicle Data API 218 captures the Data 212 that was captured from a test vehicle through the Ego Vehicle API. The Vehicle Data API 218 thus enables users to find and use the desired Anonymized Data 232.

A vehicle identification number is removed from the Data 212. Data 212 is anonymized by changing at least one specific parameter in the Data 212 in the Server 214 to create Anonymized Data 232. Highly Confidential Data 220 is changed to Anonymized Data 232 to reduce access constraints for a user. The changing of the at least one specific parameter included in the subset of the Data 212 includes changing the timestamp value of an initial frame from frames in the data to make the timestamp value of the initial frame (e.g., first event) in the subset of the Data 212 to be at time zero with subsequent frames in the at least one subset of data having a relative offset from the initial frame. Thus, the authorization for the users is able to be reduced as the users do not have access to sensitive data.

The Anonymized Data 232 is created with remaining GPS coordinates to provide information about the vehicle passing through a specific time and place. The Anonymized Data 232 is created with kinematic and positional data of the vehicle. The Anonymized Data 232 is created with kinematic and positional data of the vehicle that includes velocity data, acceleration data, latitude data, longitude data, orientation data, and a relative time offset. The Vehicle Data API 218 provides access to the kinematic and positional data of the vehicle. The Anonymized Data 232 that is created is also able to include one or more of weather data or terrain data.

The Anonymized Data 232 is used to generate scenario data used to create Data for Simulation 234 for Files 236. The Files 236 are stored in a Database (DB) 238. Thus, users without access approval are able to access the data in the DB 238, whereas only users with access approval are able to access the Data 212 in the Server 214. As shown in FIG. 2, the process associated with the Highly Confidential Data 220 for obtaining data for a New Dataset or API is generally 1-3 months 250. The process for creating Anonymized Data Without PII 230 is generally 1-2 weeks 260. However, those skilled in the art recognize that these time frames are provided as examples and embodiments described herein are not limited to the disclosed time frames.

FIG. 3 is a diagram of operation of the Vehicle Data API 300 according to at least one embodiment.

In FIG. 3, Ego Vehicle API 310 provides access to kinematic and positional data of the vehicle 312. FIG. 3 shows Vehicle 330 relative to Other Vehicles 332, 334, 336. The kinematic and positional data of the vehicle includes vehicle velocity 320, vehicle acceleration 322, vehicle location 324 (e.g., latitude and longitude coordinates of the vehicle), orientation of the vehicle 326 (e.g., yaw, yaw rate, pitch, roll data for the vehicle), and relative time offset 328.

Actors Data API 340 provides data for surrounding Objects of the Vehicle (e.g., Other Cars, Pedestrians, Infrastructure, Edge Devices, etc.) 342. FIG. 3 shows Vehicle 360 wherein data relative to Other Vehicles 362, 364, 366 (Actors 370) is obtained by Actors Data API 340. The data obtained by Actors Data API 340 for the surrounding objects of the vehicle includes the relative position of the surrounding vehicles 350, the orientation (e.g., yaw) of the surrounding vehicles 352, the relative position of the surrounding vehicles 354, the relative acceleration of the surrounding vehicles 356, and the like.

The data obtained by Ego Vehicle API 310 and Actors Data API 340 from testing vehicles are stored in a database on a server. The data stored in the server is able to be raw data or pre-processed data. However, the data in a database on the server includes sensitive data, i.e., PII (Personally Identifiable Information), such as timestamp information. PII is any information about an individual including any information that can be used to distinguish or trace an individual's identity, and any other information that is linked or linkable to an individual. Therefore, sensitive data in the database of the server is only accessible by users that have special authorization, and files are not able to be created based on the data that includes PII. In order to create files for a simulation, at least one embodiment Event Data in the database on the server is anonymized data by changing at least one specific parameter included in the subset of the data in the database on the server. A request for data acquisition for the subset of the data in the database on the server is received from the Vehicle Data API 380.

A connected car or autonomous vehicle (AV) uses wireless communication technology and exchanges information with other vehicles, edge devices, and infrastructure. Other vehicles, edge devices, and infrastructure deliver various road and surrounding information for autonomous driving along with vehicle sensor data. For example, an AV is able to receive data wirelessly from other vehicles, edge devices, and infrastructure. As mentioned above, Ego Vehicle API 310 provides access to kinematic and positional data of the vehicle 312 and Actors Data API 340 provides data for surrounding Objects of the Vehicle (e.g., Other Cars, Pedestrians, Infrastructure, Edge Devices, etc.) 342.

Sensor Data obtained by an AV and data obtained from other vehicles, and infrastructure is capable of being used by the AV for autonomous driving. Other vehicles, and infrastructure that transmit data to an AV are sometimes referred to collectively as edge devices. Sensors at an AV include devices, such as radar, LiDAR, GPS, cameras, and the like. In addition, sensor data obtained by an AV and data obtained from edge devices is able to be transmitted to a server, such as MDC Server. Data is transmitted to the AV from edge devices and data transmitted by the AV is able to be wirelessly transmitted using a wireless protocol such as Fifth Generation (5G) New Radio (NR), Fourth Generation (4G) Long Term Evolution (LTE), LTE-A, Worldwide Interoperability for Microwave Access (WiMAX), IEEE 802.11 Wi-Fi wireless local area network (WLAN), LTE-Unlicensed (LTE-U), Licensed Assisted Access (LAA), Cellular Device-to-Device (D2D), Vehicle-to-Everything (V2X), Bluetooth, General Packet Radio Service (GPRS), Wideband Code Division Multiple Access (WCDMA), or other wireless communication technologies.

The Vehicle Data API 380 anonymizes the data 382 from the Ego Vehicle API 310 and the Actors Data API 340. The Vehicle Data API 380 provides standardized and documented data models 384 and abstracts complex and diffused data schemas 386. The Vehicle Data API 380 improves data quality by selecting the best available sensor data (e.g., yaw, yaw rate, SPI, and CAN) 388.

Referring again to FIG. 2, the Vehicle Data API 218 anonymizes the Data 212 from the Server 214 to produce Anonymized Data 232 so that the absolute time of the event cannot be deduced and so other time related information cannot be used to infer specific user data because the anonymized data is not enough to identify the user or the precise time that the event occurred.

Removing the timestamps and the vehicle ID anonymizes the users, and simulations are able to use the frames with time offsets, i.e., the delta time. The GPS position data is able to be used to recreate the trajectory of the vehicle. Thus, based on the anonymized data, the simulation teamwork uses the Files 236 to create a specification that describes what happened with the vehicle, e.g., replicate exactly what the vehicle did in real life. Because the Anonymized Data 232 is anonymized data 212 from Server 214, a trace back to the user is not possible.

Removing or altering the location data is not as suitable because geographic location is important for simulations that use the geographic data for determining the overall trajectory shape. The Anonymized Data 232 that is created includes geographic context information. Other factors involved in the simulations include weather. Another factor is the particular terrain, which is able to have an impact on the overall shape of the trajectory. Thus, instead of removing time stamps, the GPS position could be altered. However, this is more complicated than providing anonymization by removing the timestamp information.

The goal of a simulation is to analyze how the vehicle responded to some specific situation. To join geographic context information, like weather, the absolute GPS is used. When dealing with absolute GPS coordinates, data from outside of what the vehicle itself senses, e.g., rain data, is able to be included. When data is anonymized by the Vehicle Data API 218 to produce Anonymized Data 232, the weather data is able to be accessed because the weather data is in the database maintained by the Server 214.

The Anonymized Data 232 is used to generate Data for Simulation 234 used to create Files 236, e.g., simulation files. The Files 236 are stored in a Database (DB) 238. Thus, users without access approval are able to access the data in the DB 238, whereas only users with access approval are able to access the Data 212 (L4 Data) on the Server 214. The Anonymized Data 232 is Anonymized Protected Data 242.

FIG. 4 is a flow chart 400 of a method for anonymizing data to create simulation files according to at least one embodiment.

In FIG. 4, the method starts S402 and data obtained from a vehicle is stored in a database of a server S410. Referring to FIG. 2, Sensitive Data with Personally Identifiable Information 210 is obtained from a vehicle and is stored as Data 212 in the Server 214, e.g., hash data. The Data 212 is able to be raw data or pre-processed data. The Data 212 in Server 214 is data acquired by sensors of vehicles while driving and has not gone through the Data Lens 216 for processing before being provided to the Server 214.

A request for data acquisition is received from a user S420. Referring to FIG. 2, a request for data acquisition to the data in the Server 214 is received from the Vehicle Data API 218. The Vehicle Data API 218 captures the Data 212 that was captured from a test vehicle through the Ego Vehicle API. The Vehicle Data API 218 thus enables users to find and use the desired Anonymized Data 232.

A vehicle identification number is removed from the data S430. Referring to FIG. 2, a vehicle identification number is removed from the data.

Referring to FIG. 3, the data obtained by Ego Vehicle API 310 and Actors Data API 340 from testing vehicles are stored in database on a server. The data stored in the server is able to be raw data or pre-processed data. However, the data in a database on the server includes sensitive data, i.e., PII (Personally Identifiable Information), such as timestamp information. PII is any information about an individual including any information that is able to be used to distinguish or trace an individual's identity, and any other information that is linked or linkable to an individual. Therefore, sensitive data in the database on the server is only accessible by users that have special authorization, and files are not able to be created based on the data that includes PII.

At least one specific parameter included in the at least one subset of the data is changed to create anonymized data S440. Referring to FIG. 2, the Vehicle Data API 218 captures the Data 212 that was captured from a test vehicle through the Ego Vehicle API. The Vehicle Data API 218 thus enables users to find and use the desired Anonymized Data 232. A vehicle identification number is removed from the data. Data 212 is anonymized by changing at least one specific parameter in the Data 212 in the Server 214 to create Anonymized Data 232. Highly Confidential Data 220 is changed to Anonymized Data 232 to reduce access constraints for a user. The changing of the at least one specific parameter included in the subset of the Data 212 includes changing the timestamp value of an initial frame from frames in the data to make the timestamp value of the initial frame (e.g., first event) in the subset of the Data 212 to be at time zero with subsequent frames in the at least one subset of data having a relative offset from the initial frame. Thus, the authorization for the users is able to be reduced as the users do not have access to sensitive data. The Anonymized Data 232 is created with remaining GPS coordinates to provide information about the vehicle passing through a specific time and place. The Anonymized Data 232 is created with kinematic and positional data of the vehicle. The Anonymized Data 232 is created with kinematic and positional data of the vehicle that includes velocity data, acceleration data, latitude data, longitude data, orientation data, and a relative time offset. The Vehicle Data API 218 provides access to the kinematic and positional data of the vehicle. The Anonymized Data 232 that is created is also able to include one or more of weather data or terrain data. The Anonymized Data 232 that is created includes geographic context information. Other factors involved in the simulations include weather. Another factor is the particular terrain, which is able to have an impact on the overall shape of the trajectory. Thus, instead of removing time stamps, the GPS position could be altered. However, this is more complicated than providing anonymization by removing the timestamp information. The goal of a simulation is to analyze how the vehicle responded to some specific situation. To join geographic context information, like weather, the absolute GPS is used. When dealing with absolute GPS coordinates, data from outside of what the vehicle itself senses, e.g., rain data, is able to be included. When data is anonymized by the Vehicle Data API 218 to produce Anonymized Data 232, the weather data is able to be accessed because the weather data is in the database maintained by the Server 214.

User access is provided to the at least one anonymized subset of the data S450. Referring to FIG. 2, to be able to use the Anonymized Data 232, Data without Personally Identifiable Information (PII) is provided the Users Without Access Approval 240. Thus, Users Without Access Approval 240 are able to submit a request for data acquisition to the Data 212 in the database in the Server 214.

Files are created for a simulation using the at least one anonymized subset of the data S460. Referring to FIG. 2, the Anonymized Data 232 is used to generate simulation data used to create Data for Simulation 234 for Files 236, e.g., simulation files. The Files 236 are stored in a Database (DB) 238. Based on the anonymized data, the simulation teamwork uses the Files 236 to create a specification that describes what happened with the vehicle, e.g., replicate exactly what the vehicle did in real life.

The process then terminates S470.

At least one embodiment of the method for anonymizing data in a database on a server includes storing data obtained from a vehicle in a database of a server, removing a vehicle identification number from the data in the database, and changing at least one specific parameter included in data in the database to create anonymized data.

Figure 5:
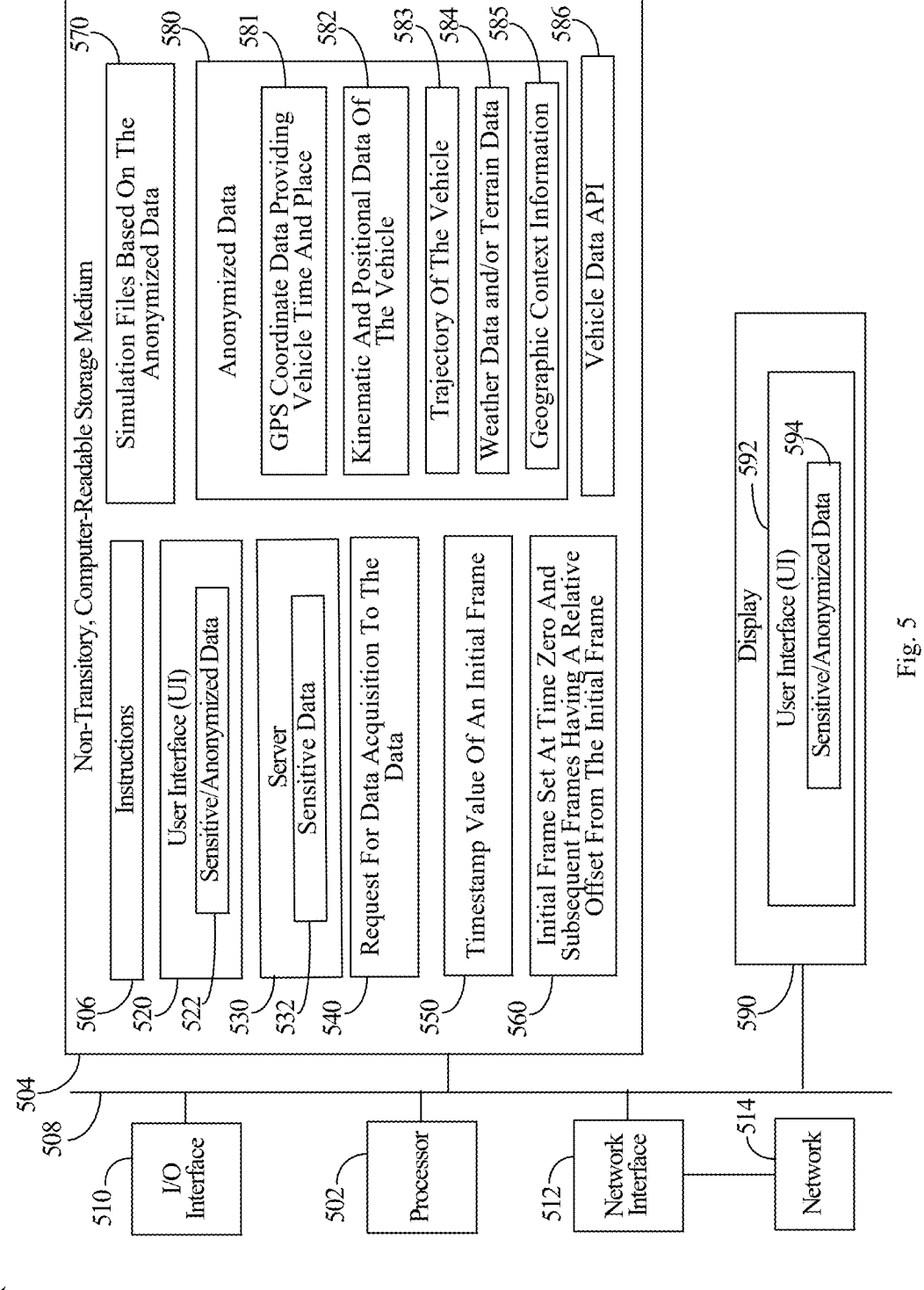
FIG. 5 is a high-level functional block diagram of a processor-based system according to at least one embodiment.

FIG. 5 is a high-level functional block diagram of a processor-based system 500 according to at least one embodiment.

In at least one embodiment, processing circuitry 500 for anonymizing data to create simulation files for creating vehicle test simulations. Processing circuitry 500 implements anonymizing data to create simulation files using Processor 502. Processing circuitry 500 also includes a Non-Transitory, Computer-Readable Storage Medium 504 that is used to anonymize data to create simulation files. Non-Transitory, Computer-Readable Storage Medium 504, amongst other things, is encoded with, i.e., stores, Instructions 506, i.e., computer program code, that are executed by Processor 502 causes Processor 502 to perform operations for anonymizing data to create simulation files. Execution of Instructions 506 by Processor 502 represents (at least in part) an application which implements at least a portion of the methods described herein in accordance with one or more embodiments (hereinafter, the noted processes and/or methods).

Processor 502 is electrically coupled to Non-Transitory, Computer-Readable Storage Medium 504 via a Bus 508. Processor 502 is electrically coupled to an Input/Output (I/O) Interface 510 by Bus 508. A Network Interface 512 is also electrically connected to Processor 502 via Bus 508. Network Interface 512 is connected to a Network 514, so that Processor 502 and Non-Transitory, Computer-Readable Storage Medium 504 connect to external elements via Network 514. Processor 502 is configured to execute Instructions 506 encoded in Non-Transitory, Computer-Readable Storage Medium 504 to cause processing circuitry 500 to be usable for performing at least a portion of the processes and/or methods. In one or more embodiments, Processor 502 is a Central Processing Unit (CPU), a multi-processor, a distributed processing system, an Application Specific Integrated Circuit (ASIC), and/or a suitable processing unit.

Processing circuitry 500 includes I/O Interface 510. I/O interface 510 is coupled to external circuitry. In one or more embodiments, I/O Interface 510 includes a keyboard, keypad, mouse, trackball, trackpad, touchscreen, and/or cursor direction keys for communicating information and commands to Processor 502.

Processing circuitry 500 also includes Network Interface 512 coupled to Processor 502. Network Interface 512 allows processing circuitry 500 to communicate with Network 514, to which one or more other computer systems are connected. Network Interface 512 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 864.

Processing circuitry 500 is configured to receive information through I/O Interface 510. The information received through I/O Interface 510 includes one or more of instructions, data, design rules, libraries of cells, and/or other parameters for processing by Processor 502. The information is transferred to Processor 502 via Bus 508. Processing circuitry 500 is configured to receive information related to a User Interface (UI) through I/O Interface 510. The information (e.g., Sensitive Data/Anonymized Data) 522 is stored in Non-Transitory, Computer-Readable Storage Medium 504 as UI 520.

In one or more embodiments, one or more Non-Transitory, Computer-Readable Storage Medium 504 having stored thereon Instructions 506 (in compressed or uncompressed form) that may be used to program a computer, processor, or other electronic device) to perform processes or methods described herein. The one or more Non-Transitory, Computer-Readable Storage Medium 504 includes one or more of an electronic storage medium, a magnetic storage medium, an optical storage medium, a quantum storage medium, or the like.

For example, the Non-Transitory, Computer-Readable Storage Medium 504 may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more Non-Transitory Computer-Readable Storage Media 504 includes a Compact Disk-Read Only Memory (CD-ROM), a Compact Disk-Read/Write (CD-R/W), and/or a Digital Video Disc (DVD).

In one or more embodiments, Non-Transitory, Computer-Readable Storage Medium 504 stores Instructions 506 configured to cause Processor 502 to perform at least a portion of the processes and/or methods for anonymizing data to create simulation files. In one or more embodiments, Non-Transitory, Computer-Readable Storage Medium 504 also stores information, such as algorithm which facilitates performing at least a portion of the processes and/or methods for anonymizing data to create simulation files.

Accordingly, in at least one embodiment, Processor 502 executes Instructions 506 stored on the one or more Non-Transitory, Computer-Readable Storage Medium 504 for anonymizing data to create simulation files. Processor 502 obtains Sensitive Data 532 From A Vehicle. Processor 502 stores the Sensitive Data 532 on a Server 530 in a database. Sensitive Data 532 is raw data or pre-processed data. Processor 502 presents a Vehicle Data API 586 that is used to access the Sensitive Data 532 in the database on the Server 530. Processor 502 executes a Request For Data Acquisition to The Data 540. Based on the Request for Data Acquisition 540, Processor 502 removes a vehicle identification number from Data 532 and creates Anonymized Data 580 by changing at least one specific parameter in the Data 522. The Anonymized Subset Of The Data 580 includes at least one of GPS Coordinate Data Providing Vehicle Time And Place 581, Kinematic And Positional Data Of The Vehicle 582 (e.g., Velocity Data, Acceleration Data, Latitude Data, Longitude Data, Orientation Data, And A Relative Time Offset), Trajectory of the Vehicle 583, Weather Data or Terrain Data 584, or Geographic Context Information 585. Processor 502 uses the Anonymized Data 580 to create Files For A Simulation Based On The Anonymized Data 570. Processor 502 obtains a Timestamp Value Of An Initial Frame 550 and then sets an Initial Frame At Time Zero And Subsequent Frames Having A Relative Offset From The Initial Frame 560.

Processor 502 uses Display 590 to present a User Interface (UI) 592, which displays Sensitive Data/Anonymized Data 594. UI 592 enables a user to create Anonymized Data 580 by changing at least one parameter included in the Sensitive Data 532.

Embodiments described herein provide a method that provides one or more advantages. For example, a Vehicle Data API anonymizes data stored in a database on a server to create files for a simulation by converting highly confidential data to anonymized protected data by changing at least one specific parameter included in the data.

An aspect of this description is directed to a method [1] for anonymizing data in a database on a server includes storing data obtained from a vehicle in a database on a server, removing a vehicle identification number from the data in the database, and changing at least one specific parameter included in data in the database to create anonymized data.

The method described in [1] further includes creating one or more files for a simulation using the anonymized data.

The method described in any of [1] or [2] further includes receiving a request for data acquisition, and providing access to the anonymized data.

The method described in [3], wherein the receiving the request for the data acquisition includes receiving the request from an application programming interface (API) having access to the server.

The method described in any one of [1] to [4], wherein the at least one specific parameter includes a timestamp value.

The method described [5], wherein the changing the timestamp value includes changing a timestamp value of an initial frame from the frames in the subset of data to make the timestamp value of the initial frame to be at time zero with subsequent frames in the subset of data having a relative offset from the initial frame.

The method described in any one of [1] to [6], wherein the creating the anonymized data includes creating the anonymized data with kinematic and positional data of the vehicle, wherein the kinematic and positional data includes at least one of velocity data, acceleration data, latitude data, longitude data, orientation data, or a relative time offset.

An aspect of this description is directed to a device for anonymizing data in a database on a server [8], including a memory storing computer-readable instructions, and a processor connected to the memory, wherein the processor is configured to execute the computer-readable instructions to perform operations to remove a vehicle identification number from the data in the database stored on the server, and change at least one specific parameter included in the data in the database to create anonymized data.

The device described in [8], wherein the processor is further configured to create one or more files for a simulation using the anonymized data.

The device described in [9], wherein the processor is further configured to receive a request for data acquisition, and provide access to the anonymized data.

The device described in [10], wherein the processor is further configured to receive the request for the data acquisition from an Application Programming Interface (API) having access to the database on the server.

The device described in any of [8] to [11], wherein the at least one specific parameter includes a timestamp value.

The device described in [12], wherein the data stored in the database includes a subset of data, and wherein the processor is further configured to change the timestamp value by changing a timestamp value of an initial frame from frames in the subset of data to make the timestamp value of the initial frame to be at time zero with subsequent frames in the subset of data having a relative offset from the initial frame.

The device described in any one of [8] to [13], wherein the processor is further configured to create the anonymized data by creating the anonymized data with kinematic and positional data of the vehicle, wherein the kinematic and positional data includes at least one of velocity data, acceleration data, latitude data, longitude data, orientation data, or a relative time offset.

An aspect of this description is directed to a non-transitory computer-readable media having computer-readable instructions stored thereon [15], which when executed by a processor causes the processor to perform operations including storing data obtained from a vehicle in a database on a server, removing a vehicle identification number from the data in the database, and changing at least one specific parameter included in the data in the database to create anonymized data.

The non-transitory computer-readable media described in [15] further includes creating files s for a simulation using the anonymized data.

The non-transitory computer-readable media described in any one of [15] or [16], further comprising receiving a request for data acquisition, and providing access to the anonymized data.

The non-transitory computer-readable media described in any one of [15] to [17], wherein the at least one specific parameter includes a timestamp value.

The non-transitory computer-readable media described in [18], wherein the changing the timestamp value includes changing, in a subset of data, a timestamp value of an initial frame from frames in the subset of data to make the timestamp value of the initial frame to be at time zero with subsequent frames in the subset of data having a relative offset from the initial frame.

The non-transitory computer-readable media described in any one of [15] to [19], wherein the creating the anonymized data includes creating the anonymized data with kinematic and positional data of the vehicle, wherein the kinematic and positional data includes at least one of velocity data, acceleration data, latitude data, longitude data, orientation data, or a relative time offset.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for anonymizing data in a database on server, comprising:

storing data obtained from a vehicle in a database on a server;

removing a vehicle identification number from the data in the database;

changing at least one specific parameter included in the data in the database, wherein the changing the at least one specific parameter in the data includes changing a timestamp value so that an absolute time of an event associated with the vehicle cannot be deduced;

using kinematic and positional data of the vehicle to obtain geographic context information; and creating anonymized data that includes kinematic and positional data of the vehicle and the geographic context information.

2. The method of claim 1, further comprising creating one or more files for a simulation using the anonymized data.

3. The method of claim 1, further comprising:

receiving a request for data acquisition; and providing access to the anonymized data.

4. The method of claim 3, wherein the receiving the request for the data acquisition includes receiving the request from an application programming interface (API) having access to the database on the server.

5. The method of claim 1, wherein the changing the timestamp value prevents specific user data from being inferred using time related information.

6. The method of claim 1, wherein the changing the timestamp value includes changing, in a subset of the data, the timestamp value of an initial frame from frames in the subset of the data to make the timestamp value of the initial frame to be at time zero with subsequent frames in the subset of the data having a relative offset from the initial frame.

7. The method of claim 1, wherein the kinematic and positional data includes at least one of velocity data, acceleration data, latitude data, longitude data, orientation data, or a relative time offset, and wherein the geographic context information includes weather.

8. A device for anonymizing data in a database on a server, comprising:

a memory storing computer-readable instructions; and a processor connected to the memory, wherein the processor is configured to execute the computer-readable instructions to perform operations to:

store data obtained from a vehicle in a database;

remove a vehicle identification number from the data in the database stored on the server;

change at least one specific parameter included in the data in the database by changing a timestamp value so that an absolute time of an event associated with a vehicle cannot be deduced;

use kinematic and positional data of the vehicle to obtain geographic context information; and create anonymized data that includes kinematic and positional data of the vehicle and the geographic context information.

9. The device of claim 8, wherein the processor is further configured to create one or more files for a simulation using the anonymized data.

10. The device of claim 8, wherein the processor is further configured to:

receive a request for data acquisition; and provide access to the anonymized data.

11. The device of claim 10, wherein the processor is further configured to receive the request for the data acquisition from an Application Programming Interface (API) having access to the database on the server.

12. The device of claim 8, wherein the timestamp value changed by the processor prevents specific user data from being inferred using time related information.

13. The device of claim 8, wherein the data stored in the database includes a subset of the data, and wherein the processor is further configured to change the timestamp value by changing the timestamp value of an initial frame from frames in the subset of the data to make the timestamp value of the initial frame to be at time zero with subsequent frames in the subset of the data having a relative offset from the initial frame.

14. The device of claim 8, wherein the kinematic and positional data includes at least one of velocity data, acceleration data, latitude data, longitude data, orientation data, or a relative time offset, and wherein the geographic context information includes weather.

15. A non-transitory computer-readable media having computer-readable instructions stored thereon, which when executed by a processor causes the processor to perform operations comprising:

storing data obtained from a vehicle in a database on a server;

removing a vehicle identification number from the data in the database;

changing at least one specific parameter included in the data in the database, wherein the changing the at least one specific parameter in the data includes changing a timestamp value so that an absolute time of an event associated with the vehicle cannot be deduced;

using kinematic and positional data of the vehicle to obtain geographic context information; and creating anonymized data that includes kinematic and positional data of the vehicle and the geographic context information.

16. The non-transitory computer-readable media of claim 15 further comprising creating files for a simulation using the anonymized data.

17. The non-transitory computer-readable media of claim 15, further comprising:

receiving a request for data acquisition; and providing access to the anonymized data.

18. The non-transitory computer-readable media of claim 15, wherein the changing the timestamp value prevents specific user data from being inferred using time related information.

19. The non-transitory computer-readable media of claim 15, wherein the changing the timestamp value includes changing, in a subset of the data, the timestamp value of an initial frame from frames in the subset of the data to make the timestamp value of the initial frame to be at time zero with subsequent frames in the subset of the data having a relative offset from the initial frame.

20. The non-transitory computer-readable media of claim 15, wherein the kinematic and positional data includes at least one of velocity data, acceleration data, latitude data, longitude data, orientation data, or a relative time offset, and wherein the geographic context information includes weather.

* * * * *